Aug. 26, 1930.  J. E. BOYD  1,774,168
METHOD OF PRODUCING COLD MIXED ASPHALTIC COMPOSITION
FOR ROAD MAKING AND OTHER USES
Filed July 22, 1926
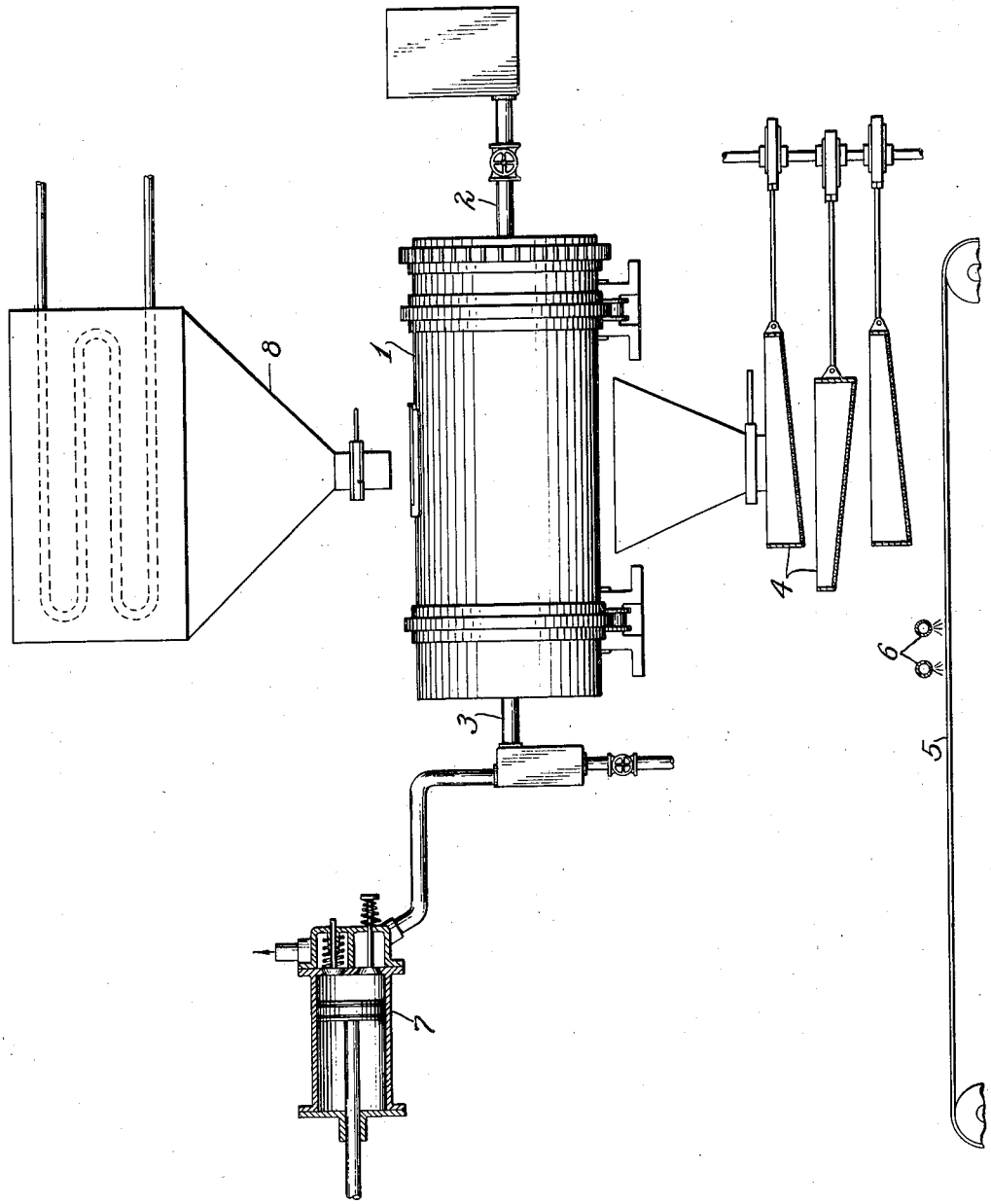
INVENTOR
Joseph E. Boyd
BY
Townsend + Decker
ATTORNEYS Patented Aug. 26, 1930

1,774,168

UNITED STATES PATENT OFFICE

JOSEPH E. BOYD, OF ATLANTA, GEORGIA, ASSIGNOR TO CRAIG R. ARNOLD, OF ATLANTA, GEORGIA

METHOD OF PRODUCING COLD MIXED ASPHALTIC COMPOSITION FOR ROAD MAKING AND OTHER USES

Application filed July 22, 1926. Serial No. 124,126.

My invention consists in a method of producing a cold mixed composition of bituminous material and suitable aggregates or mineral matter in sub-divided condition and adapted for use when spread and rolled for a road surface, pavements, flooring, roofing, and other surfaces and for any other purpose for which a mixture of an aggregate, such as sand or other mineral matter, and a bituminous binder may be employed. The invention consists in the novel method hereinafter described of artificially producing in granular or prepared form a surfacing material consisting of bituminous material and aggregates or subdivided mineral matter which shall be capable of transportation and use cold without becoming so compacted as to necessitate the re-preparation or granulation of the material prior to final use.

The invention consists substantially in thoroughly mixing the asphalt or other bituminous binder in fluid or in semi-fluid state with the aggregates or similar subdivided mineral material preferably in dry condition, and so as to cause the particles or pieces of the aggregate to be thoroughly coated with the binder, sub-dividing the mixture into small particles to reduce it to granular condition as for instance screening it while still heated and soft, and allowing or causing the granulated material to cool, after which the cooled granular material with its individually coated particles is collected for transportation cold to the place of use where it may be compacted as a road surface or other surface sheet by pressure without necessarily re-preparing the material or re-heating the same.

To expedite the cooling, the granulated material may be dropped onto a slowly moving belt conveyer on which it is spread out and exposed to the air for a sufficient length of time to permit the coating on the individual granules or particles to become thoroughly cooled. To further expedite the cooling, air may be blown through the particles or granules as they drop or there may be a spray of water dashed through them, or the cooling air or liquid may be directed upon the material as it travels with the belt.

The resultant product has the property of retaining for a long period its individuality or granular condition and may be transported in this state without becoming consolidated or compacted and may be dumped along a road in process of covering and used when desired by spreading it over the surface and then compressed by rolling as under ordinary practice. In effect the cold mixed method of my invention is started as in the hot mix method where the composition has to be transported while hot and rolled while it retains its heat. In the operation as previously conducted, should the hot mixed product cool off during handling or transportation, it will become compacted and useless which result is avoided by my invention.

In carrying out my invention I may employ from 8% to 10% of asphalt to 90% of aggregates more or less depending upon the nature of the asphalt or bituminous element and grading of mineral aggregate, it being understood that these proportions may vary according to the nature of the bituminous element and that the invention may be carried out by employing either native or artificial bituminous material. By the term "asphalt" as employed herein I mean to include the materials ordinarily included according to the nomenclature of the art as practiced in this country and therefore I include any bituminous material such as solid or semi-solid native material or by-products of oil refining, tars and any other artificial bituminous materials. As will be understood the proportions of the composition will vary as well known in the art according to the particular kind of bituminous or binding material employed. For the best results I prefer to employ as the bituminous or binding material the ordinary asphalt of commerce known in the trade as oil asphalt and obtained as a distillate of crude oil through treatment of the oil to remove the volatile ingredients and as the aggregate or mineral ingredient I prefer to use sand or coarser aggregate consisting of broken stone of any desired size mixed with the asphalt suitably heated to render it fluid in the proportions above stated or approximately those proportions.

In practicing the invention it is frequently desirable to pre-heat the sand to dry the same and expel the moisture while rendering it more ready to take up a coating of the fluid asphalt. However, a slight amount of moisture in the sand may exist without interfering seriously with the operation.

It will be understood that to make the sheet when laid more durable a predetermined amount of any desired filler such as dust limestone may be mixed with the asphalt and aggregate during the preparation of the material although Portland cement can and is often used on account of its fineness although rather expensive.

The accompanying drawings illustrate one of the forms of apparatus that may be employed in practicing my invention.

In said drawings 1 indicates a revolving cylinder or mixing chamber of a pug mill having suitable stirring devices and 2 indicates a pipe or conduit entering the cylinder arranged coaxially with the axis of revolution of the cylinder to deliver the hot asphalt or other bituminous material in liquid condition to the cylinder. 3 indicates a similar pipe by means of which a partial vacuum may be produced within the cylinder. 4 is a series of screens diminishing in size of mesh from the top to the bottom screen and provided with means for shaking or agitating them when the mixed material is dumped onto the topmost screen from the mixing cylinder, and 5 is a belt conveyor receiving the particles or granulations separated from one another by the screening operation and by means of which they are conveyed to delivery point for storage or shipment. 6 indicates any suitable means for applying a spray of water or other fluid or liquid to the material on the belt or as it drops from the screen to hasten the cooling process. 7 is an exhaust pump connected to pipe 3 and 8 is a hopper from which the aggregate and other material may be dropped into the mixing cylinder or chamber through an opening in the latter adapted to be sealed.

What I claim as my invention is:—

1. The herein described method of producing a composition of bituminous material and aggregates suitable for transportation and use cold, consisting in mixing the aggregates with the bituminous material in fluid state while maintaining the same in a relatively hot condition and thereafter separating the mixture into relatively fine individually coated pieces or particles of the aggregate while still hot and thereafter cooling the individually coated and separated particles thus produced.

2. The herein described method of producing a composition of bituminous material and aggregates of mineral matter suitable for transportation and use cold, consisting in mixing the aggregate with a heated fluid bituminous binder while maintaining the same in a heated condition and thereafter separating the mixture, after the removal from the mixer into relatively fine individual particles or pieces of the aggregate each having a coating of the bituminous material while partially cooling the mixture and thereafter completing the cooling of the same.

3. The herein described method of producing a composition of bituminous binder and aggregates suitable for transportation and use cold, consisting in mixing sand with hot asphalt while maintaining the same heated, removing the sand coated with asphalt from the mixer and then reducing the mixture to granular condition during the initial cooling of the heated mixture and thereafter immediately cooling the granulated mixture.

4. The herein described method of producing a composition of bituminous material and aggregates suitable for transportation and use cold, consisting in mixing sand and asphalt in heated condition in the proportion approximately of 8% to 10% of asphalt and 90% of sand as the aggregate, removing the same from the mixer and subdividing the mixture while still soft and heated to divide it into small particles or granules, consisting of the granules of sand coated with asphalt, and cooling the coated granules so that the compound shall be capable of transportation and use cold in the desired location without becoming compacted so as to necessitate re-preparation or granulation of the material prior to laying.

5. The herein described method of producing a cold mixed composition of asphalt and aggregates of mineral matter, consisting in mixing oil asphalt in fluid condition and aggregates, removing the same from the mixer and then agitating and screening the mixture to sub-divide it into individual particles or pieces coated with asphalt and cooling said individual particles or pieces thus coated with hot asphalt by exposure to the air or other cooling medium to produce material capable of being transported in bulk cold without becoming compacted.

6. The herein described method of producing a composition of bituminous binder and aggregates suitable for transportation and use cold as a consolidated coating consisting in mixing the aggregate with the bituminous material by stirring them in the presence of one another while heated, removing the same after mixing and while in heated condition from the mixer, sub-dividing the mixture while hot by screening and agitation into particles each coated with the asphalt and subsequently cooling the individual particles.

Signed at Atlanta, in the county of Fulton and State of Georgia, this 2nd day of July, A. D. 1926.

JOSEPH E. BOYD.